(12) United States Patent
Vandiver et al.

(10) Patent No.: US 10,410,540 B2
(45) Date of Patent: Sep. 10, 2019

(54) EDUCATIONAL BUILDING BLOCKS TO MODEL PROTEIN ASSEMBLY FROM AMINO ACIDS

(71) Applicant: Massachusetts Institute of Technology, Cambridge, MA (US)

(72) Inventors: John Kim Vandiver, Lexington, MA (US); Kathleen M. Vandiver, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 260 days.

(21) Appl. No.: 15/459,232

(22) Filed: Mar. 15, 2017

(65) Prior Publication Data

US 2017/0270828 A1    Sep. 21, 2017

Related U.S. Application Data

(60) Provisional application No. 62/308,278, filed on Mar. 15, 2016.

(51) Int. Cl.
  *G09B 23/26*   (2006.01)
  *G09B 19/00*   (2006.01)

(52) U.S. Cl.
  CPC .............. *G09B 23/26* (2013.01); *G09B 19/00* (2013.01)

(58) Field of Classification Search
  USPC .......................... 434/276, 277, 278, 279, 281
  See application file for complete search history.

(56) References Cited

U.S. PATENT DOCUMENTS

| 3,296,714 A | 1/1967 | Klotz |
| 3,445,940 A | 5/1969 | Dziulak |
| 3,594,924 A | 7/1971 | Baker |
| 3,802,097 A | 4/1974 | Gluck |

(Continued)

FOREIGN PATENT DOCUMENTS

CA    2546668 A1    11/2007

OTHER PUBLICATIONS

International Search Report and the Written Opinion of the International Searching Authority, International Application No. PCT/US2017/022429, 11 pages, dated Jun. 9, 2017.

(Continued)

*Primary Examiner* — Kurt Fernstrom

(74) *Attorney, Agent, or Firm* — Sunstein Kann Murphy & Timbers LLP

(57) ABSTRACT

A kit of educational building blocks includes a first set of amino acid side chain building blocks, each amino acid side chain building block corresponding to a distinct one of 20 distinct amino acid side chains, a second set of identical amino end building blocks, each amino end building block having a first end configured to removably engage with the amino acid side chain building blocks to form an amino end-side chain block combination, and a third set of identical acid end building blocks, each acid end building block having a first end configured to removably engage with amino end-side chain block combination to produce an amino acid building block assembly. The first, second, and third set of blocks are configured so that a plurality of amino acid building block assemblies can be linked to one another so as to model a series of linked amino acids in a protein.

21 Claims, 14 Drawing Sheets

(56) References Cited

U.S. PATENT DOCUMENTS

| | | | |
|---|---|---|---|
| 3,804,417 A * | 4/1974 | Dawson | A63F 3/0478 |
| | | | 273/243 |
| 3,841,001 A * | 10/1974 | Nicholson | G09B 23/26 |
| | | | 434/278 |
| 3,854,223 A | 12/1974 | Dingman, II | |
| 3,903,616 A | 9/1975 | Gage | |
| 3,939,581 A * | 2/1976 | Clarke, Jr. | G09B 23/26 |
| | | | 434/278 |
| 4,184,271 A | 1/1980 | Barnett, Jr. | |
| 4,378,218 A * | 3/1983 | Fletterick | G09B 23/26 |
| | | | 434/279 |
| 4,416,635 A * | 11/1983 | Smith | B29C 64/141 |
| | | | 434/152 |
| 6,036,497 A | 3/2000 | Langmuir | |
| 6,280,199 B1 * | 8/2001 | Baker | G09B 23/24 |
| | | | 434/276 |
| 6,343,937 B1 | 2/2002 | Curtis | |
| D461,719 S | 9/2002 | Guilloton et al. | |
| D482,411 S | 11/2003 | Stevens et al. | |
| 6,652,285 B1 | 11/2003 | Breivik | |
| D617,835 S | 6/2010 | Spiring et al. | |
| D745,934 S | 12/2015 | Casarez et al. | |
| 9,779,638 B2 * | 10/2017 | Casarez | G09B 23/26 |
| 9,842,514 B2 * | 12/2017 | Hoelzer | G09B 23/26 |
| 9,916,772 B1 * | 3/2018 | Schell | G09B 23/20 |
| 2002/0076682 A1 | 6/2002 | Herman et al. | |
| 2003/0170601 A1 | 9/2003 | Scheetz et al. | |
| 2006/0228682 A1 | 10/2006 | Garratt et al. | |
| 2012/0196259 A1 | 8/2012 | Woodward | |
| 2015/0235568 A1 | 8/2015 | Hoelzer et al. | |
| 2016/0133157 A1 | 5/2016 | Casarez et al. | |

OTHER PUBLICATIONS

"Teacher Guide for Lego DNA Set," published 2004, pp. 1-45, 47 pages.

Advertisement for Lego Life Science education sets, including the DNA set, published 2004, 2 pages.

* cited by examiner

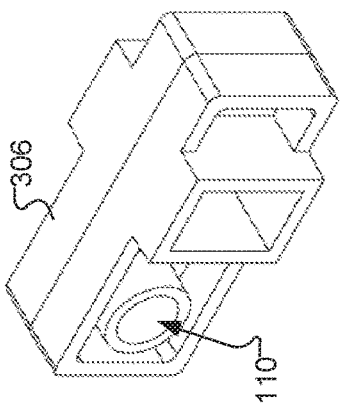
FIG. 3A
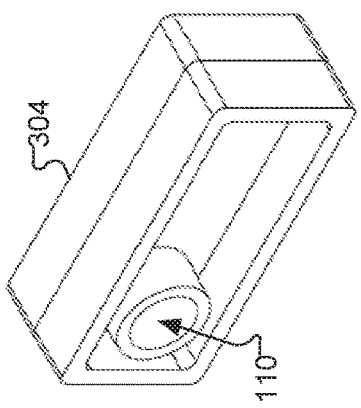
FIG. 3B
FIG. 3C
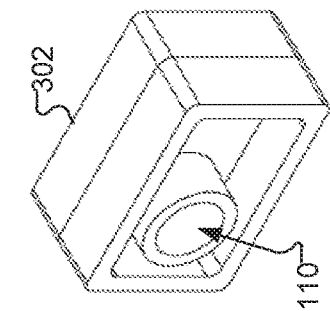
FIG. 3D
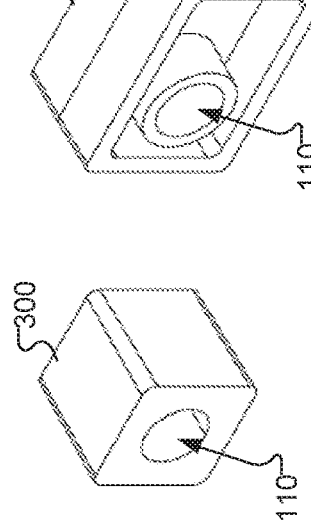
FIG. 3E
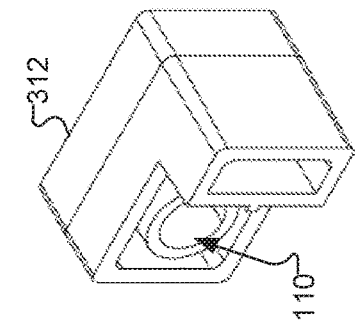
FIG. 3F
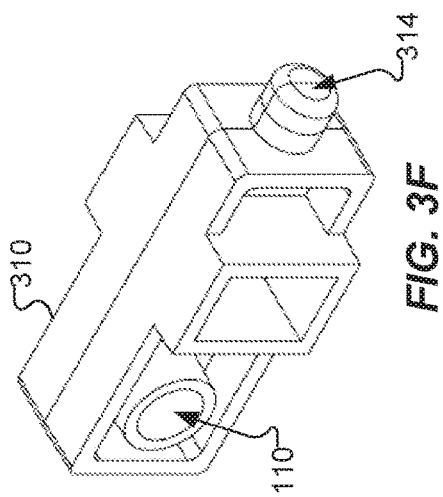
FIG. 3G
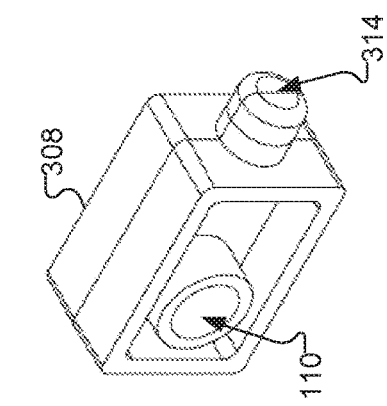

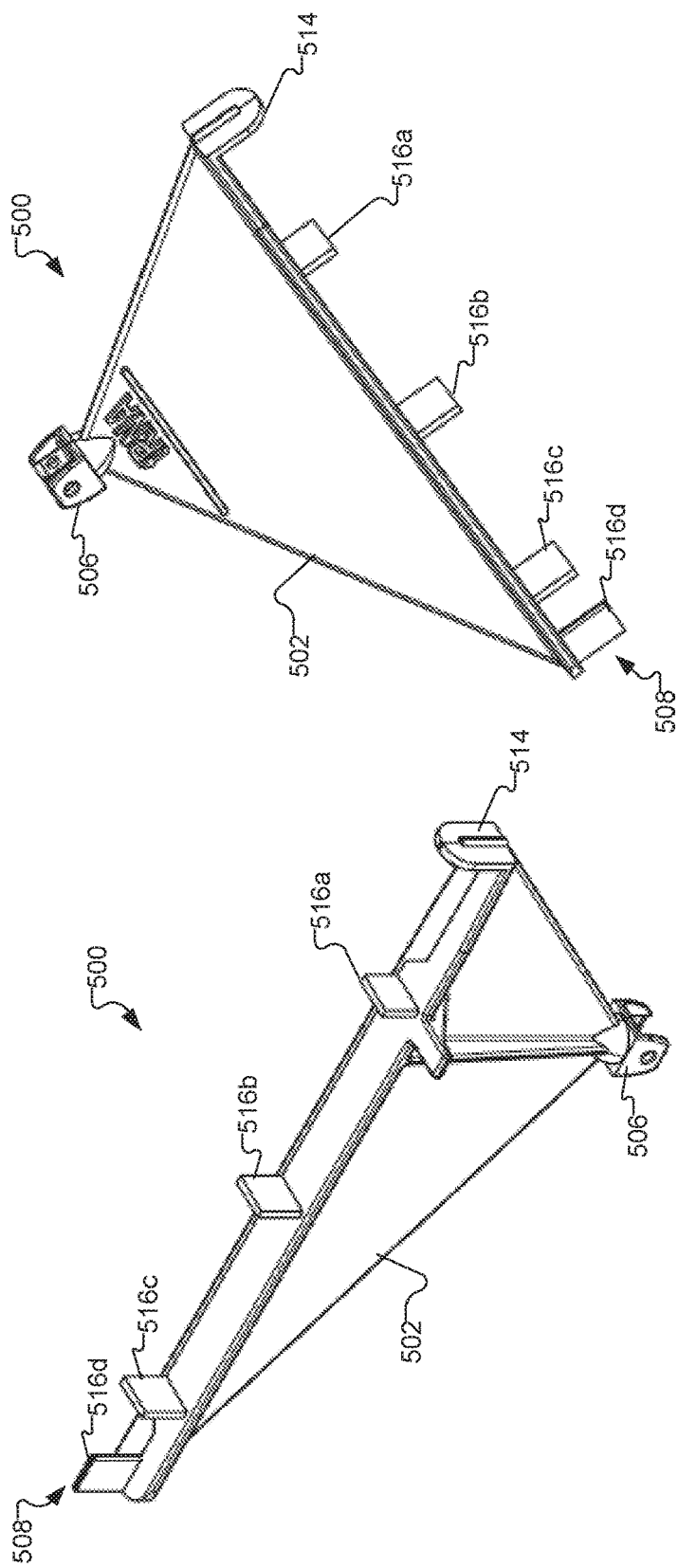

EDUCATIONAL BUILDING BLOCKS TO MODEL PROTEIN ASSEMBLY FROM AMINO ACIDS

CROSS REFERENCE TO RELATED APPLICATIONS

The present application claims the benefit of U.S. Provisional Patent Application No. 62/308,278, filed Mar. 15, 2016, which is incorporated herein by reference in its entirety.

TECHNICAL FIELD

The present invention relates to educational building blocks, and more particularly to blocks representing amino acids and components thereof for use in learning environments.

BACKGROUND ART

Building blocks have been used in educational environments to help students visualize concepts in a particular subject area. Teachers use building blocks to provide a tactile approach to help their students better grasp abstract lessons.

SUMMARY OF THE EMBODIMENTS

In accordance with an embodiment of the invention, there is provided a kit of educational building blocks that can be assembled to model protein assembly from amino acids. The kit includes a first set of amino acid side chain building blocks, each amino acid side chain building block corresponding to a distinct one of twenty (20) distinct amino acid side chains, and a second set of identical amino end building blocks, each amino end building block having a first end configured to removably engage with any of the amino acid side chain building blocks to form an amino end-side chain block combination. The kit further includes a third set of identical acid end building blocks, each acid end building block having a first end configured to removably engage with any amino end-side chain block combination to produce an amino acid building block assembly, wherein the first, second, and third set of blocks are configured so that a plurality of amino acid building block assemblies can be linked to one another so as to model a series of linked amino acids in a protein.

In a related embodiment, the first end of the second set of identical amino end building blocks is shaped as a rod with a long axis of length l, the rod having a cross-section corresponding to a polygon. Optionally, the first end of the third set of identical acid end building blocks is shaped with a cavity to mate with the first end of the second set of identical amino end building blocks, the cavity having a cross-section corresponding to the polygon.

In a further related embodiment, the polygonal cross-section of the rod prevents rotational motion of one of the third set of identical acid end building block relative to one of the second set of identical amino end building blocks about the long axis of the rod, when the one of the third set of identical acid end is coupled to the one of the second set of identical amino end building blocks. Optionally, the first set of amino acid side chain building blocks is shaped to have a cylindrical aperture, the circumference of the aperture greater than a circumference of a circle inscribing the polygon, such that, when the amino-side chain block combination is formed, the cylindrical aperture does not prevent rotational motion of one of the first set of amino acid side chain building blocks relative to one of the second set of identical amino end building blocks. Optionally, the polygon is cross-shaped.

In yet a further related embodiment, the first set of amino acid side chain building blocks is shaped and colored in twenty differentiated combinations such that each of the first set of amino acid side chain building blocks is visually distinguishable from one another. Optionally, a second end of each of the amino end building blocks is shaped to removably engage with a second end of each of the acid end building blocks.

In a further related embodiment, the second end of each of the amino end building blocks is shaped to allow rotational motion of the second end of each of the acid end building blocks in at least one axis. Optionally, the second end of each of the amino end building blocks is shaped to allow rotational motion of the second end of each of the acid end building blocks in three axes. Also optionally, the second end of each of the amino end building blocks is shaped as a bracket and the second end of each of the acid end building blocks is shaped as a knob.

In yet another related embodiment, a subset of the first set of amino acid side chain building blocks has a first end configured to removably engage with a fourth set of special feature building blocks. The kit of this embodiment includes the fourth set of special feature building blocks, each special feature building block having a first end configured to removably engage with the subset of the first set of amino acid side chain building blocks. Optionally, the fourth set of special feature building blocks is shaped as a flexible tube having a second end configured to removably engage with the subset of the first set of amino acid side chain building blocks, the flexible tube corresponding to a disulfide bond. Also optionally, the flexible tube is configured to connect two distinct amino acid building block assemblies. Further optionally, the fourth set of special feature building blocks is shaped as a cylinder corresponding to a phosphorylated protein.

In a related embodiment, the first end of the second set of identical amino end building blocks is shaped as a rod with a long axis of length l and a subset of the first set of amino acid side chain building blocks has an anti-rotation shape that prevents rotational motion of the subset structures about the long axis of the rod.

In yet another related embodiment, the kit is configured to model primary, secondary, tertiary, and quaternary levels of protein folding. Optionally, the kit includes a cell membrane layout mat illustrating a cell membrane and positions for at least two models of proteins.

In a further related embodiment, the kit includes a fifth set of tRNA building blocks corresponding to a tRNA, each of the fifth set of building blocks having a first end shaped as a bracket shape to removably engage with the first end of the second set of amino end building blocks and a second end configured to removably engage with a model of an anti-codon. Optionally, the kit includes a ribosome layout mat illustrating reading of mRNA code by tRNA and assembling protein as a sequence of amino acids.

BRIEF DESCRIPTION OF THE DRAWINGS

The foregoing features of embodiments will be more readily understood by reference to the following detailed description, taken with reference to the accompanying drawings, in which:

FIGS. 3A-3G are perspective views of exemplary embodiments of side chain building blocks.

FIGS. 5B and 5C are perspective views of an exemplary embodiment of a tRNA building block;

DETAILED DESCRIPTION OF SPECIFIC EMBODIMENTS

Definitions. As used in this description and the accompanying claims, the following terms shall have the meanings indicated, unless the context otherwise requires:

A "set" includes at least one member.

An "amino acid building block assembly" is a structure that includes at least one amino acid side chain building block, at least one amino end building block, and at least one acid end building block in a configuration wherein the structure is physically stable to the point that it can be picked up by any one of the components thereof without coming apart.

A first building block is "removably engaged" with a second building block when a physically stable configuration is established between the two building blocks (albeit possibly only in the presence of a third building block) and the two building blocks can be disengage from one another without damaging the first or second building blocks.

The kit of educational building blocks described herein allow a user to model amino acid assembly and the process of translation, in which messenger ribonucleic acid (mRNA) molecules are decoded by a ribosome and translation RNA (tRNA) molecules to produce an amino acid chain. This amino acid chain, or polypeptide, can fold into a protein according to four levels of protein folding. In many of the embodiments described below, the structures of the educational building blocks convey real-life functionality of amino acid assembly, translation, and protein folding. Note that the building blocks can be manufactured via injection-molding, 3D printing, and the like. A design application entitled Educational Building Blocks to Model Protein Assembly from Amino Acids, filed on Mar. 15, 2017 under Ser. No. 29/597,190, shows various components of the kit and is incorporated by reference herein in its entirety.

Amino Acid Assembly

Figure 1A:
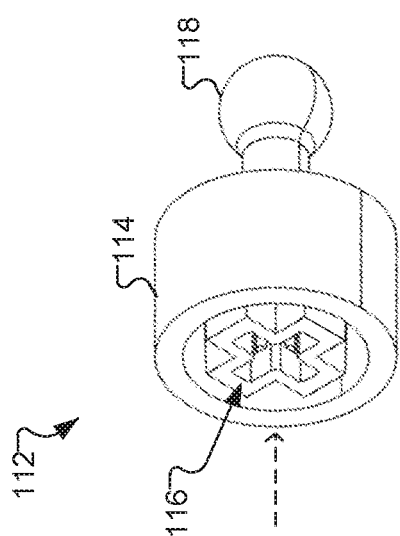
FIGS. 1A-1C are perspective views of exemplary embodiments of amino acid building blocks configured to be assembled into a model of an amino acid.
Figure 1B:
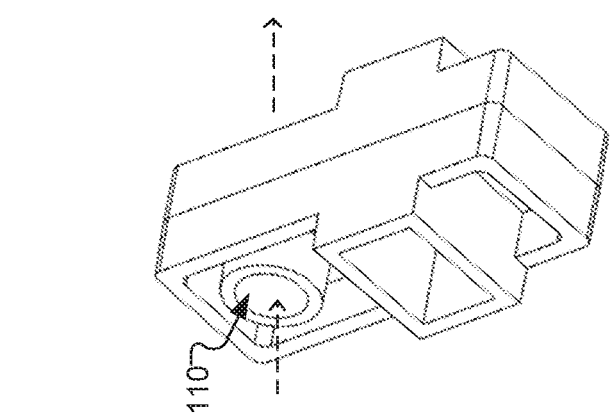
Figure 1C:
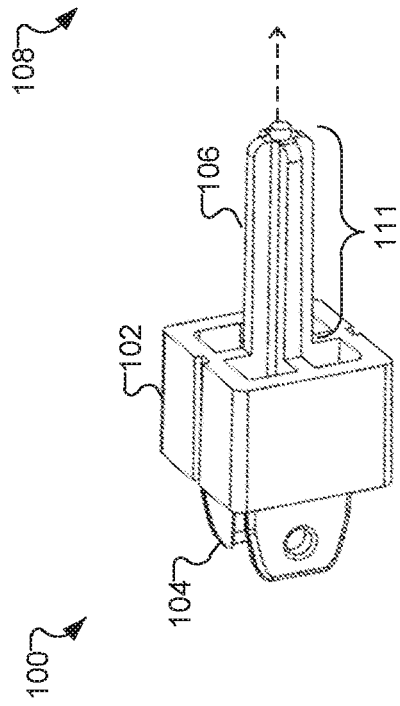

FIGS. 1A-1C are perspective views of exemplary embodiments of amino acid building blocks configured to be assembled into a model of an amino acid. FIG. 1A is a perspective view of an amino end building block 100 representing the amino end of an amino acid. The exemplary amino end building block 100 has a body 102 with a first end 104 and a second end 106. The amino end building block 100 is configured to removably engage with a side chain building block 108 to form an amino end-side chain block combination. Specifically, the second end 106 of the amino end is shaped like a rod extending from the body 102. Note that the rod has a long axis 111 and a cross-section with one or more angles so as to form a polygonal cross-section.

FIG. 1B is a perspective view of an exemplary embodiment of a side chain building block 108 representing the side chain portion of an amino acid. The exemplary side chain building block 108 can have a shape and color corresponding to one of twenty (20) distinct amino acids having differing side chains. The second end 106 of the amino end building block 100 is configured to removably engage with an aperture 110 in the side chain building block 108. The amino end-side chain block combination is configured to removably engage with an acid end building block 112 to form an amino acid building block assembly, described further below. FIG. 1C is a perspective view of an exemplary embodiment of an acid end building block 112 representing the acid end of an amino acid. The exemplary acid end building block 112 has a body 114 with a first end 116 and a second end 118.

Figure 1D:
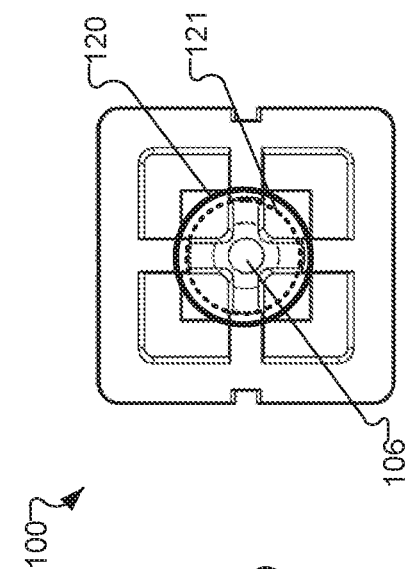
FIG. 1D is a side view of the second end of the exemplary amino end building block.

FIG. 1D is a side view of the second end 106 of the exemplary amino end building block 100. Note that the aperture 110 in the exemplary side chain building block 108 is shaped like a cylinder with a circumference 120 greater than a circle 121 inscribing the polygon shape of the cross-section of the rod of the second end 106 of the amino end building block 100. This configuration allows the side chain building block 108 to rotate with respect to the long axis 111 of the rod without being impeded by the angles of the rod or by friction against the rod.

Figure 1E:
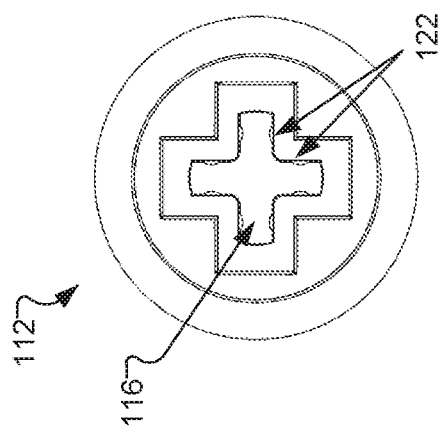
FIG. 1E shows a side view of the first end of the exemplary acid end building block.

FIG. 1E shows a side view of the first end 116 of the exemplary acid end building block 112. The first end 116 is a cavity having a similar shape to the polygonal cross-section of the rod of the second end 106 of the amino end building block 100. In addition to having a certain depth, the cavity has ridges 122 to further secure the rod in place when assembling the amino acid model.

Figure 2:
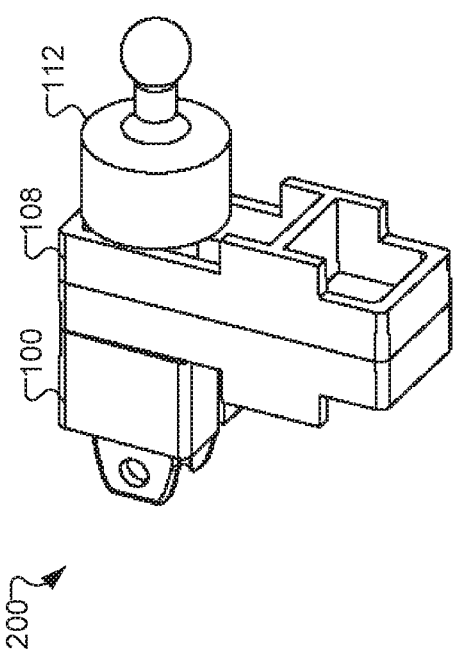
FIG. 2 is a perspective view of an exemplary embodiment of an amino acid assembly comprising an amino end building block, side chain building block, and acid end building block.

FIG. 2 is a perspective view of an exemplary embodiment of an amino acid assembly 200 comprising an amino end building block 100, side chain building block 108, and acid end building block 112. As illustrated in FIGS. 1A-1C, the amino end building block 100 is removably engaged with the side chain building block 108, and this amino end-side chain combination is removably engaged with the acid end building block 112. Once assembled, the amino acid model 200 is in a physically stable condition and can be used as a unit to form other or more complex structures, as described further below.

Note that FIGS. 1A-1C show specific exemplary embodiments of shapes that are ascribed to each of the components of an amino acid. However, in some embodiments, the specific shapes that allow the assembly of the building blocks representing the components of an amino acid can be different than what is shown while maintaining the functionality of the described shapes. In some embodiments, the first end 116 of the acid end building block 112 can be rod-shaped while the second end 106 of the amino end building block 100 can be cavity-shaped. Thus, the acid end building block 112 can removable engage with a side chain building block 108 to form an acid end-side chain building block combination and this combination can be further removably engaged with an amino end building block 100 to form an amino acid assembly 200.

FIGS. 3A-3G are perspective views of exemplary embodiments of side chain building blocks. In some embodiments, the different shapes 300-312 of a set of side chain building blocks can each be colored in a different color such that each of the set of side chain building blocks are different from one another in the combination of these two aspects (shape and color). In other embodiments, the same building block, in terms of shape and color, can be used to represent more than one amino acid with the side chain. A building block may represent more than one amino acid based on similar chemical properties of the more than one amino acids. Note that, in some embodiments, the set of side chain building blocks can have twenty different shapes and/or colors corresponding to each of the twenty different amino acids.

TABLE 1

Listing of the shapes in each of FIGS. 3A-3G, exemplary colors, and corresponding representation of specific amino acids.

| FIG. # | Color | Amino acid having side chain |
|---|---|---|
| FIG. 3A | yellow | glycine (Gly) |
| FIG. 3B | pink | aspartic acid (Asp) |
| FIG. 3B | yellow | alanine (Ala), valine (Val) |
| FIG. 3C | pink | glutamic acid (Glu) |
| FIG. 3C | blue | arginine (Arg), lysine (Lys) |
| FIG. 3C | green | glutamine (Gln), asparagine (Asn) |
| FIG. 3C | yellow | methionine (Met), leucine (Leu), isoleucine (Ile) |
| FIG. 3D | yellow | phenylalanine (Phe), tryptophan (Trp) |
| FIG. 3E | yellow | cysteine (Cys) |
| FIG. 3E | green | threonine (Thr), serine (Ser) |
| FIG. 3F | blue | histidine (His) |
| FIG. 3F | green | tyrosine (Tyr) |
| FIG. 3G | yellow | proline (Pro) |

The above Table 1 is a list of shapes illustrated in FIGS. 3A-3G and their corresponding amino acids. The table also lists a color that can be used to differentiate sets of shapes from each other. For example, a pink shape of FIG. 3B represents aspartic acid while a yellow-colored shape of FIG. 3B represents both alanine and valine. As further described below, the colors of these building blocks can impart functionality to the model. For example, the yellow-colored side chain building blocks, when coupled to amino end and acid end building blocks, represent hydrophobic amino acids. In this example, the other colors represent hydrophilic amino acids.

FIG. 3A is a perspective view of an exemplary side chain building block 300 in the shape of a block with aperture 110 and, when assembled into an amino acid model, the model represents glycine (Gly). FIG. 3B is a perspective view of an exemplary side chain building block 302 in the shape of a short rectangle with aperture 110. When a pink-colored side chain building block 302 is assembled into an amino acid model, the model represents aspartic acid (Asp). When a yellow-colored side chain building block 302 is assembled into an amino acid model, the model represents alanine (Ala) or valine (Val). FIG. 3C is perspective view of an exemplary side chain building block 304 in the shape of a long rectangle with aperture 110. When a pink-colored side chain building block 304 is assembled into an amino acid model, the model represents glutamic acid (Glu). When a blue-colored side chain building block 304 is assembled into an amino acid model, the model represents arginine (Arg) or lysine (Lys). When a green-colored side chain building block 304 is assembled into an amino acid model, the model represents glutamine (Gln) or asparagine (Asn). When a yellow-colored side chain building block 304 is assembled into an amino acid model, the model represents methionine (Met), leucine (Leu), or isoleucine (Ile).

FIG. 3D is a perspective view of an exemplary side chain building block 306 in the shape of a cross with aperture 110 and, when assembled into an amino acid model, the model represents phenylalanine (Phe) or tryptophan (Trp). FIG. 3E is a perspective view of an exemplary side chain building block 308 in the shape of a short rectangle having a post 314 at one end, with aperture 110. When a yellow-colored side chain building block 308 is assembled into an amino acid model, the model represents cysteine (Cys). When a yellow-colored side chain building block 308 is assembled into an amino acid model, the model represents threonine (Thr) or serine (Ser).

FIG. 3F is a perspective view of an exemplary side chain building block 310 in the shape of a cross having a post 314 at one end, with aperture 110. When a blue-colored side chain building block 310 is assembled into an amino acid model, the model represents histidine (His). When a yellow-colored side chain building block 310 is assembled into an amino acid model, the model represents tyrosine (Tyr).

Figure 3H:
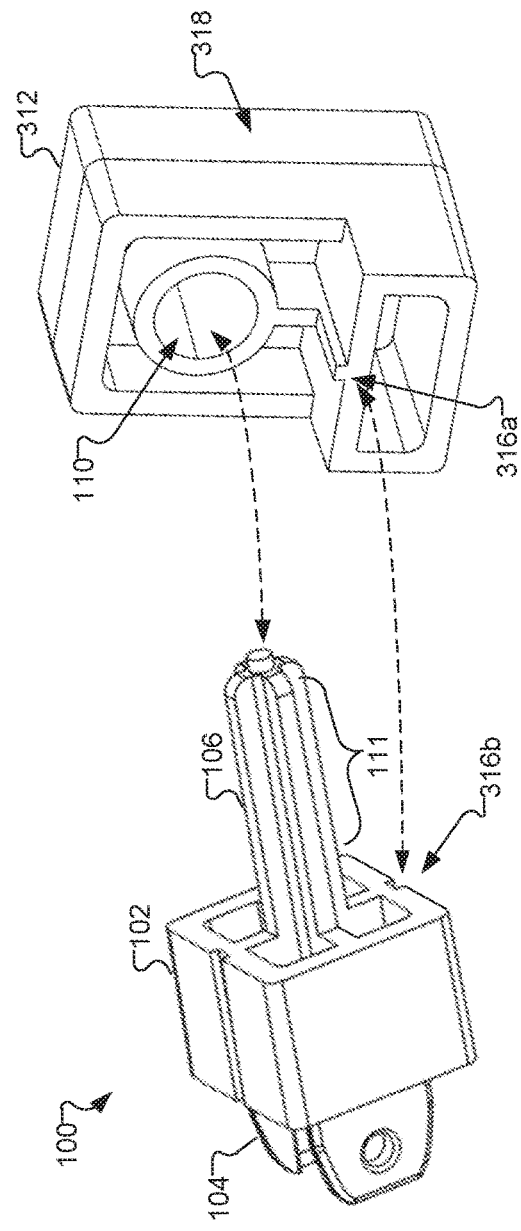
FIG. 3H is a diagram illustrating the assembly of an exemplary amino end building block with the exemplary side chain building block of FIG. 3G.

FIG. 3G is a perspective view of an exemplary side chain building block 312 in the shape of an "L" with aperture 110 and, when assembled into an amino acid model, the model represents proline (Pro). FIG. 3H is a diagram illustrating the assembly of an exemplary amino end building block 100 with the exemplary side chain building block 312 of FIG. 3G. Note that side chain building block 312 is equipped with a ridge 316a shaped and sized to fit into the slot 316b of the body 102 of amino end building block 100. This ridge 316a prevents the side chain building block 312 from rotating around the long axis 111 of the rod-shaped second end 106 of the amino end building block. In this embodiment, the slot 316b is aligned with the open end of the bracket so as allow the side chain building block 312 to lie flat when the amino acid is assembled and connected in a chain with other assemblies. See FIG. 9 for an exemplary chain of amino acid assemblies and note that the assemblies are oriented such that they can lay flat on a surface adjacent to a side 318.

Figure 3I:
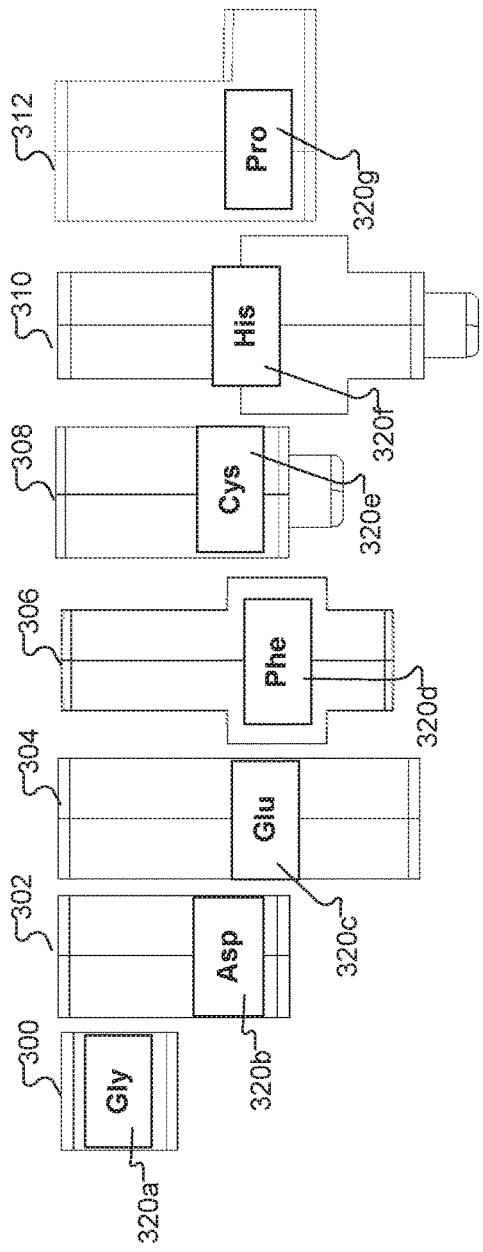
FIG. 3I shows a side view of exemplary side chain building blocks having labels on one or more sides.

In yet another embodiment, each of the side chain building blocks of the kit can be labeled with the amino acid they correspond to. FIG. 3I shows a side view of exemplary side chain building blocks 300-312 having labels 320a-320g on one or more sides. For example, according to Table 1, side chain building block 306 can represent either phenylalanine (Phe) or tryptophan (Trp) and may be labeled as shown.

Figures 4A, 4B:
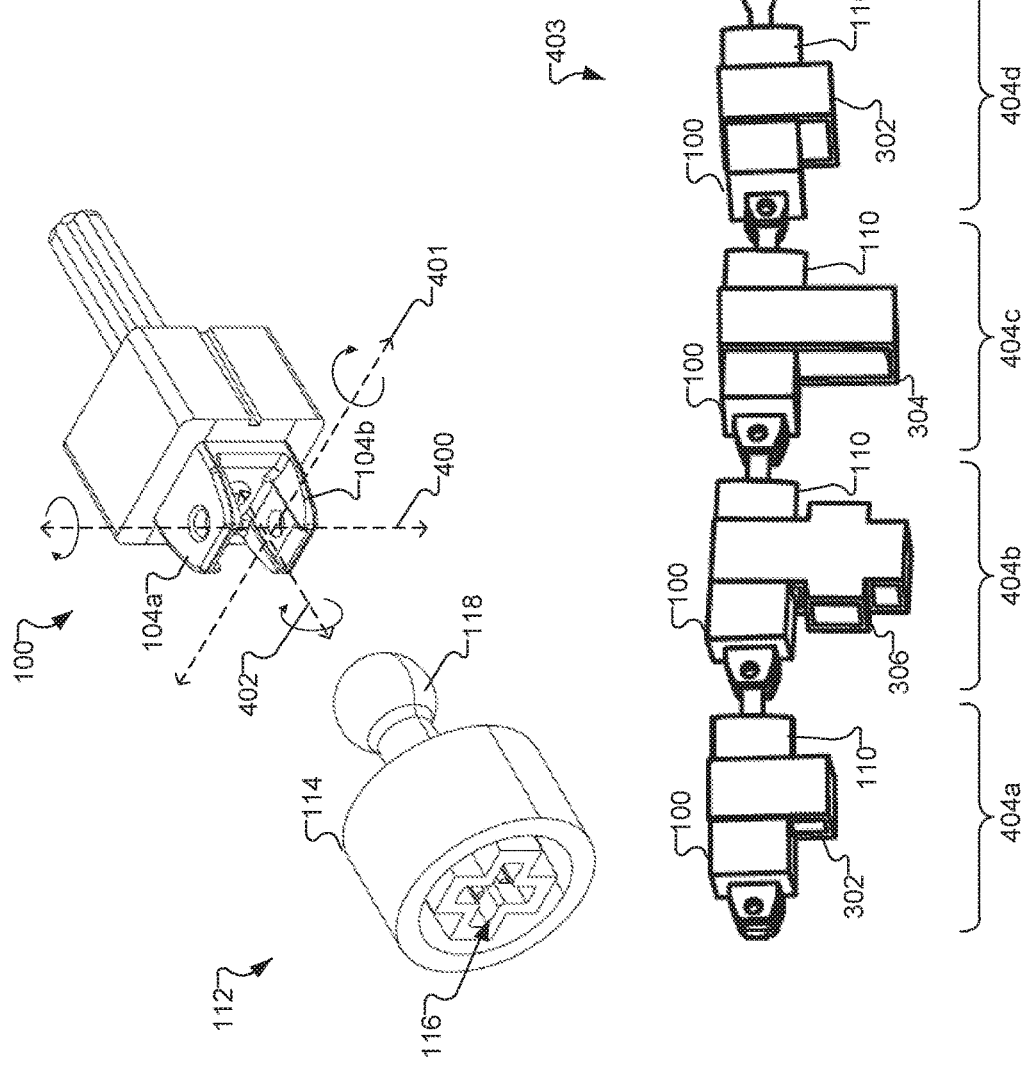
FIG. 4A is a perspective view of the exemplary amino end building block, showing, in greater detail, the bracket shape of the first end.
FIG. 4B is a perspective view of an exemplary embodiment of an amino acid assembly chain comprising four amino acid assemblies that are coupled via the bracket-and-ball system shown in FIG. 4A.

FIG. 4A is a perspective view of the exemplary amino end building block 100, showing, in greater detail, the bracket shape of the first end 104. The bracket, having a first side 104a and second side 104b, is configured to removably engage with the ball shape of the second end 118 of acid end building block 112. The bracket-shape provides three axes 400, 401, and 402 of rotation for the ball shaped second end 118 of the acid end building block 112. In some embodiments, the bracket may limit the range of the ball shape rotating in at least one of the three axes 400, 401, and 402. For example, the rotation of the ball shape may be limited in the degrees of rotation about axis 401 as compared to rotation about axis 400 or axis 402. Using this bracket-and-ball system, two amino acid assemblies can be linked to one another to form a chain of amino acid assemblies representing a polypeptide. FIG. 4B is a perspective view of an exemplary embodiment of an amino acid assembly chain 403 comprising four amino acid assemblies 404a, 404b, 404c, and 404d that are coupled via the bracket-and-ball system shown in FIG. 4A.

Modeling Translation

Figure 5A:
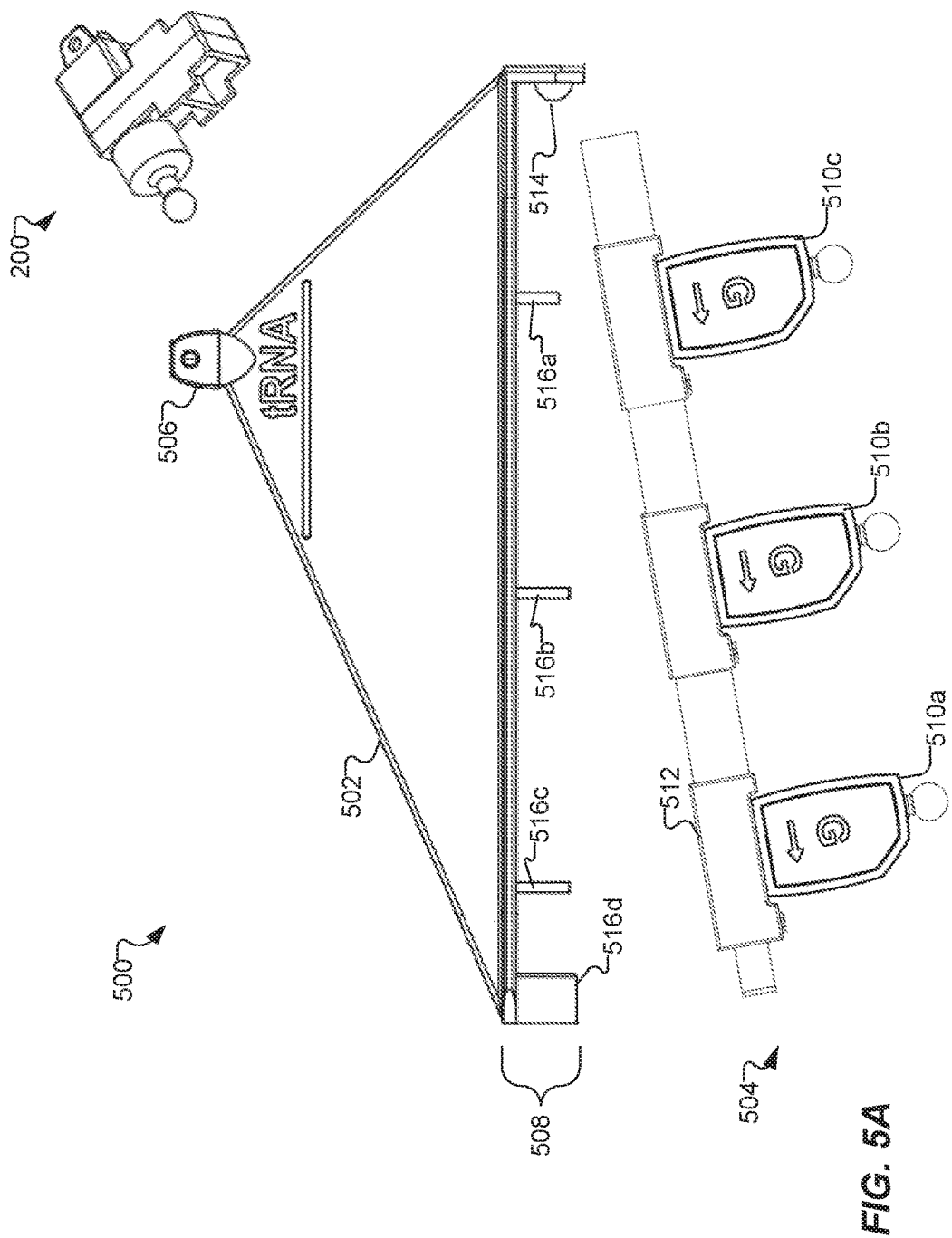
FIG. 5A is a diagram of an exemplary embodiment of a group of building blocks used to model translation of mRNA to protein.

FIG. 5A is a diagram of an exemplary embodiment of a group of building blocks used to model translation of mRNA to protein. The group of building blocks includes a tRNA building block 502, a set of mRNA nucleotide building blocks 504, and an amino acid assembly 200. In some embodiments, the tRNA building block 502 is a triangle-shaped block having a first end 506 and a second end 508. The first end 506 can be shaped like a bracket similar to the bracket-and-ball system shown in FIG. 4A. The ball of the second end 118 of the acid end building block 112 of the amino acid assembly 200 can be removably engaged with the bracket of the first end 506 of the tRNA building block.

The second end 508 of the tRNA building block 502 is shaped like a dock for the mRNA nucleotide building blocks 504. In the example shown in FIG. 5A, the mRNA nucleotide building blocks 504 include three guanine building blocks 510a, 510b, and 510c held together by a set of backbone building blocks 512. For further description and additional examples of the mRNA nucleotide building blocks 504, refer to commonly owned U.S. patent application Ser. No. 14/539,443 published on May 12, 2016 as U.S. Patent Application Publication No. 2016/0133157, which is incorporated herein by reference in its entirety. The second end 508 of the tRNA building block 502 has multiple compartments configured to receive and removably engage with the nucleotide building blocks 504. Element 514 of the second end 508 is configured to hold in place the backbone 512 with the aid of the partitions 516a, 516b, 516c, and 516d. In other embodiments, the tRNA building block 502 can be other shapes such as square, rectangular, circular, elliptical, irregular, and the like. FIGS. 5B and 5C are perspective views of the exemplary tRNA building block and include the above described elements.

Figure 6:
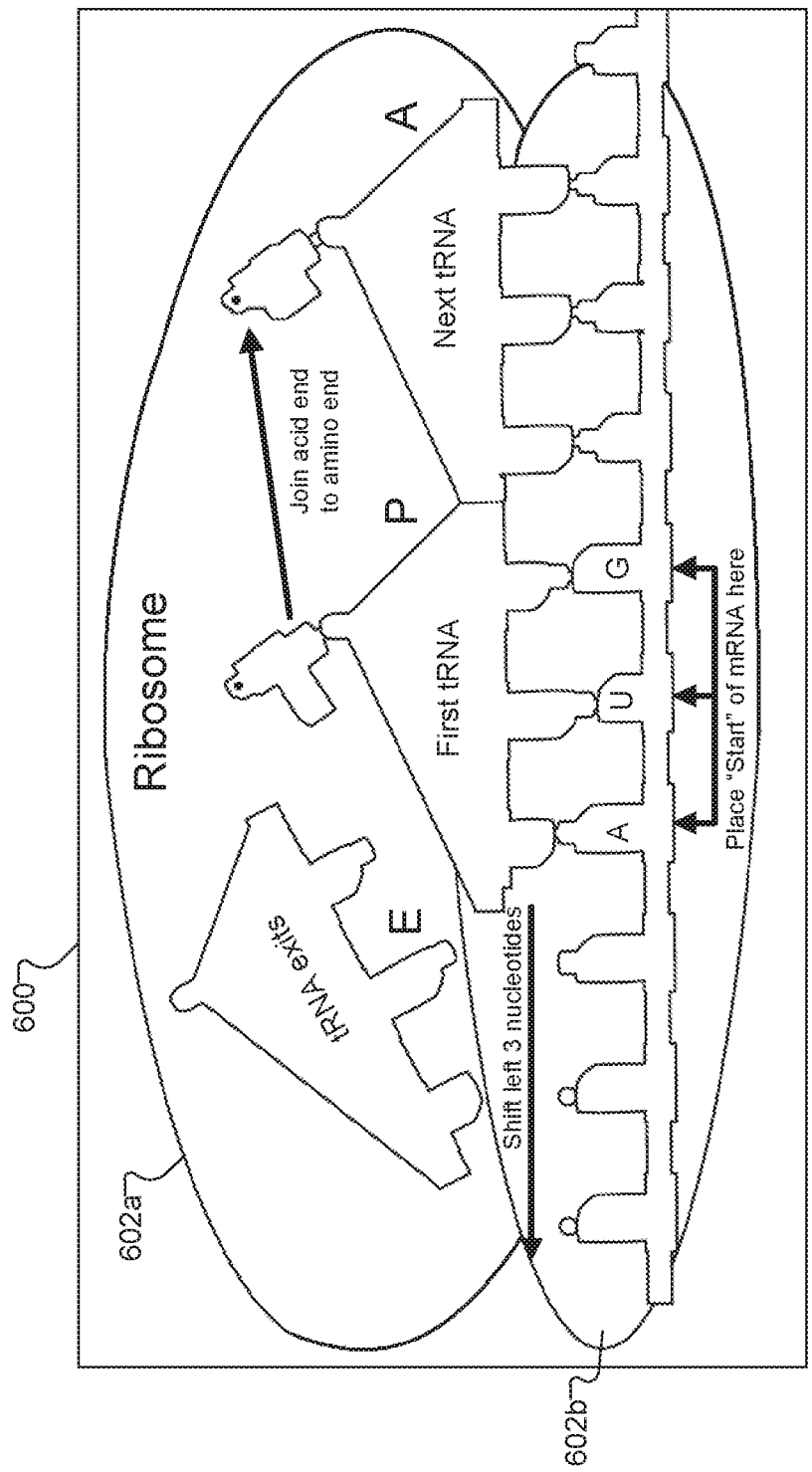
FIG. 6 is a top view of an exemplary embodiment of a ribosome mat illustrating the translation process.
Figure 7:
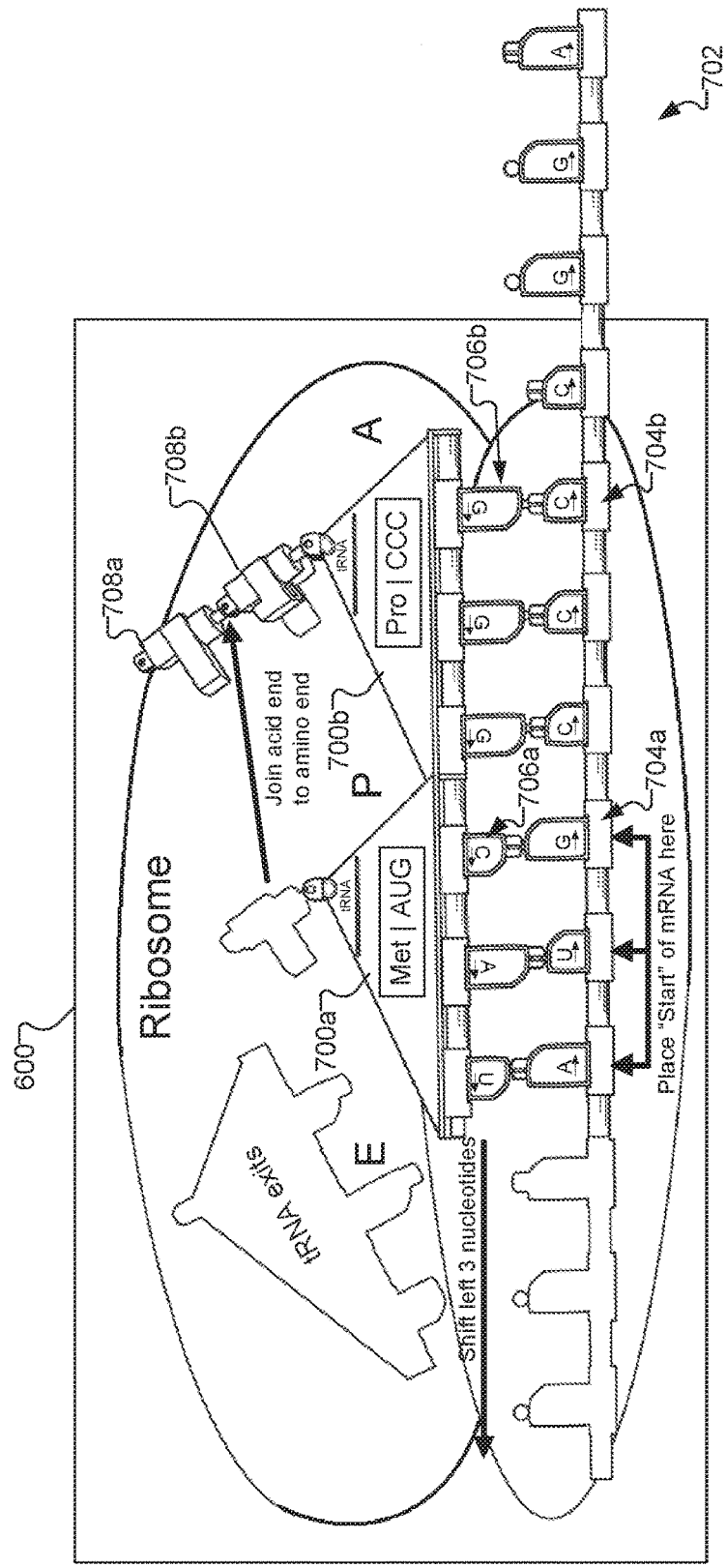
FIG. 7 is a top view of the exemplary ribosome mat hosting tRNA building blocks and at sites P and A.

FIG. 6 is a top view of an exemplary embodiment of a ribosome mat illustrating the translation process. The ribosome mat can be included in some embodiments of the kit of education building blocks to aid the user of the educational building blocks through the modeling of the process of translation using at least one tRNA building block 502, a set of mRNA nucleotide building blocks 504, and at least one amino acid assembly 200. The exemplary ribosome mat 600 shows a representation of a ribosome having a large subunit 602a and small subunit 602b. The ribosome has three sites ("E" for exit site, "P" for peptidyl site, and "A" for aminoacyl site) to position the tRNA building block 502. FIG. 7 is a top view of the exemplary ribosome mat 600 hosting tRNA building blocks 700a and 700b at sites P and A. To model the translation process, the user can feed mRNA nucleotide building blocks 702 onto the ribosome mat 600. At the "start" position of "AUG" codon 704a of the mRNA building blocks, the user can attach a tRNA building block 700a having an amino acid assembly 708a to anti-codon nucleotide building blocks 706a (labeled "C", "A", and "U"). Next, the user can position tRNA building block 700b (removably engaged with an amino acid assembly 708b) to site A to complement a second codon 704b of mRNA nucleotide building blocks (labeled "C", "C", "C") with anti-codon 706b. To simulate the forming of a polypeptide, the user can disengage the amino acid assembly 708a from tRNA 700a to engage with amino acid assembly 708b. As mRNA nucleotide building blocks 702 are "read", the user creates a chain of amino acid assemblies from the building blocks of the kit.

Modeling Post-Translation Modifications

Figure 8:
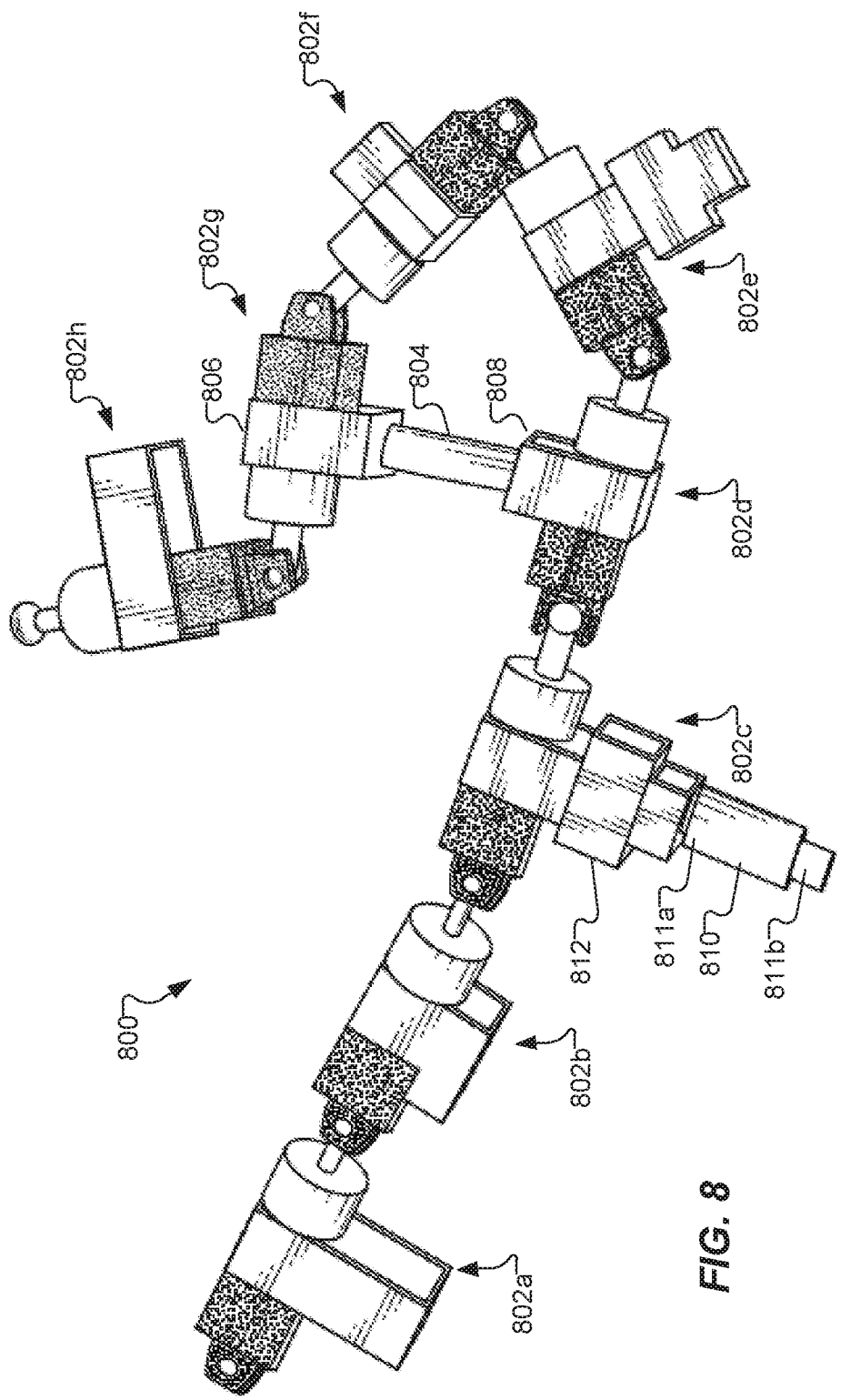
FIG. 8 is a perspective view of an exemplary embodiment of a chain of amino acid assemblies having post-translational modifications.

FIG. 8 is a perspective view of an exemplary embodiment of a chain of amino acid assemblies having post-translational modifications. In this particular example, the chain 800 includes eight amino acid assemblies 802a-802h. The user of the kit of educational building blocks can modify the chain by linking different amino acid assemblies of the chain with a special feature building block. For example, amino acid assembly 802d is removably engaged with amino acid assembly 802g by a disulfide bond building block 804. The disulfide bond building block 804 may also be used to link two different chains of amino acid assemblies to each other. In some embodiments, the disulfide bond building block 804 can be a flexible tube with a first end and a second end, each configured to attach to a post 314 of a side chain building block. In this example, the disulfide bond building block 804 is attached to the respective posts of side chain building blocks 806 and 808.

Another type of special feature building block is a phosphorylated protein building block 810. The phosphorylated protein building block 810 can be attached to a post 314 of a side chain building block. In this example, the first end 811a of block 810 is removably engaged with side chain building block 812. Note that the second end 811b of the phosphorylated protein building block 810 is configured to further engage with the first ends of additional phosphorylated protein building blocks to form serially linked phosphorylated protein building blocks.

Modeling Four Levels of Protein Folding

Figure 9:
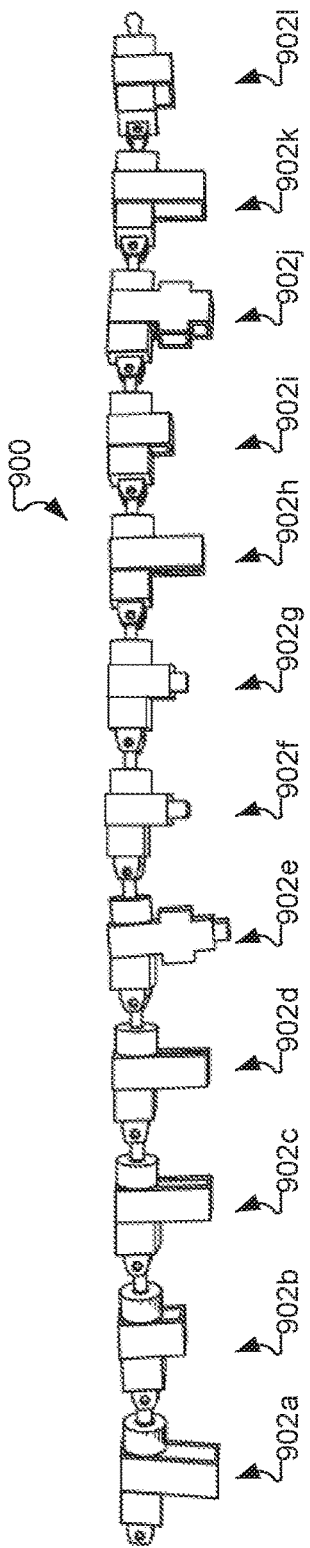
FIG. 9 is a perspective view of an exemplary embodiment of a chain of amino acid assemblies representing the primary level of protein folding.

FIG. 9 is a perspective view of an exemplary embodiment of a chain of amino acid assemblies representing the primary level of protein folding. This particular chain 900 includes twelve (12) amino acid assemblies 902a-902l. The modeling of the primary level of protein folding is easily enabled by the bracket-and-ball system (described in detail above).

Figure 10:
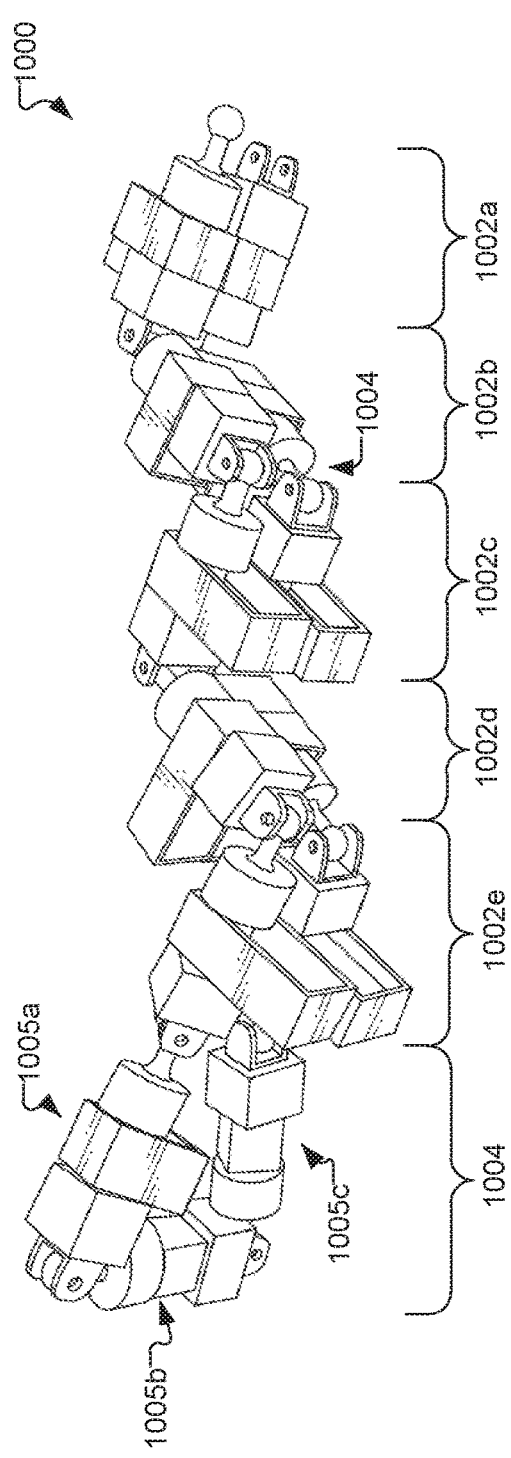
FIG. 10 is a perspective view of an exemplary embodiment of a chain of amino acid assemblies representing the secondary level of protein folding, the pleated sheet.

FIG. 10 is a perspective view of an exemplary embodiment of a chain of amino acid assemblies representing the secondary level of protein folding, the pleated sheet. To model a pleated sheet, the 13-member chain 1000 can be folded in half to approximate a "sheet". In some embodiments, there can be more than two folds or layers of chains to form the sheet. Note that nearly each of the amino acid assemblies are paired with a parallel amino acid assembly to form a paired amino acid assembly 1002a-1000e. These paired assemblies can then be manipulated to form "pleats" in the sheet by bending the paired assemblies at the bracketed connections. For example, paired assembly 1002b can be bent toward paired assembly 1002c by rotating the ball of the bracket-and-ball system 1004. This system and its rotating functionality is further described above and illustrated in FIG. 4A. Note that not all of the amino acid assemblies can form pleats in this manner. For example, in this example, there are three amino acid assemblies 1005a-1005c that form a loop 1006 at the end of the pleated sheet 1000.

Figure 11:
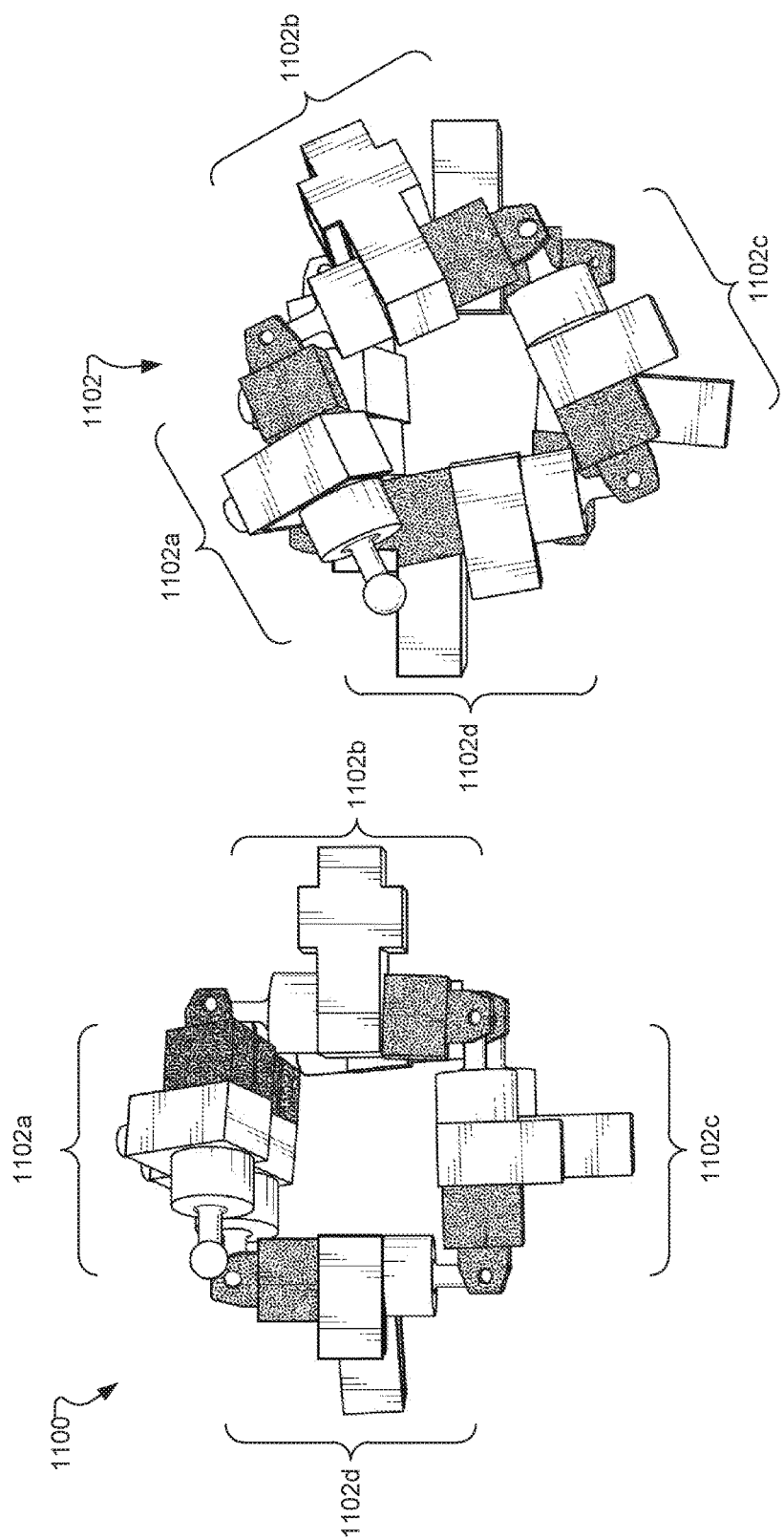
FIGS. 11A-11B are perspective views of exemplary embodiments of a helix of amino acid assemblies in the secondary level of protein folding.

FIGS. 11A-11B are perspective views of exemplary embodiments of a helix of amino acid assemblies in the secondary level of protein folding. FIG. 11A shows an exemplary counter-clockwise helix 1100, spiraling upward, in which four (4) amino acid assemblies 1102a-1102d make up a complete turn of the helix. FIG. 11B shows an exemplary counter-clockwise helix 1104, spiraling upward, in which approximately 3.5 amino acid assemblies (1102a, 1102b, 1102c, and a portion of 1102d) make up a complete turn of the helix. Note that in this embodiment of the kit of educational building blocks, the blocks can model both the 4-assembly helix turn, which may be easier for a user to build, and the 3.5-assembly helix turn, which is the form of the helix found in nature.

Figure 12:
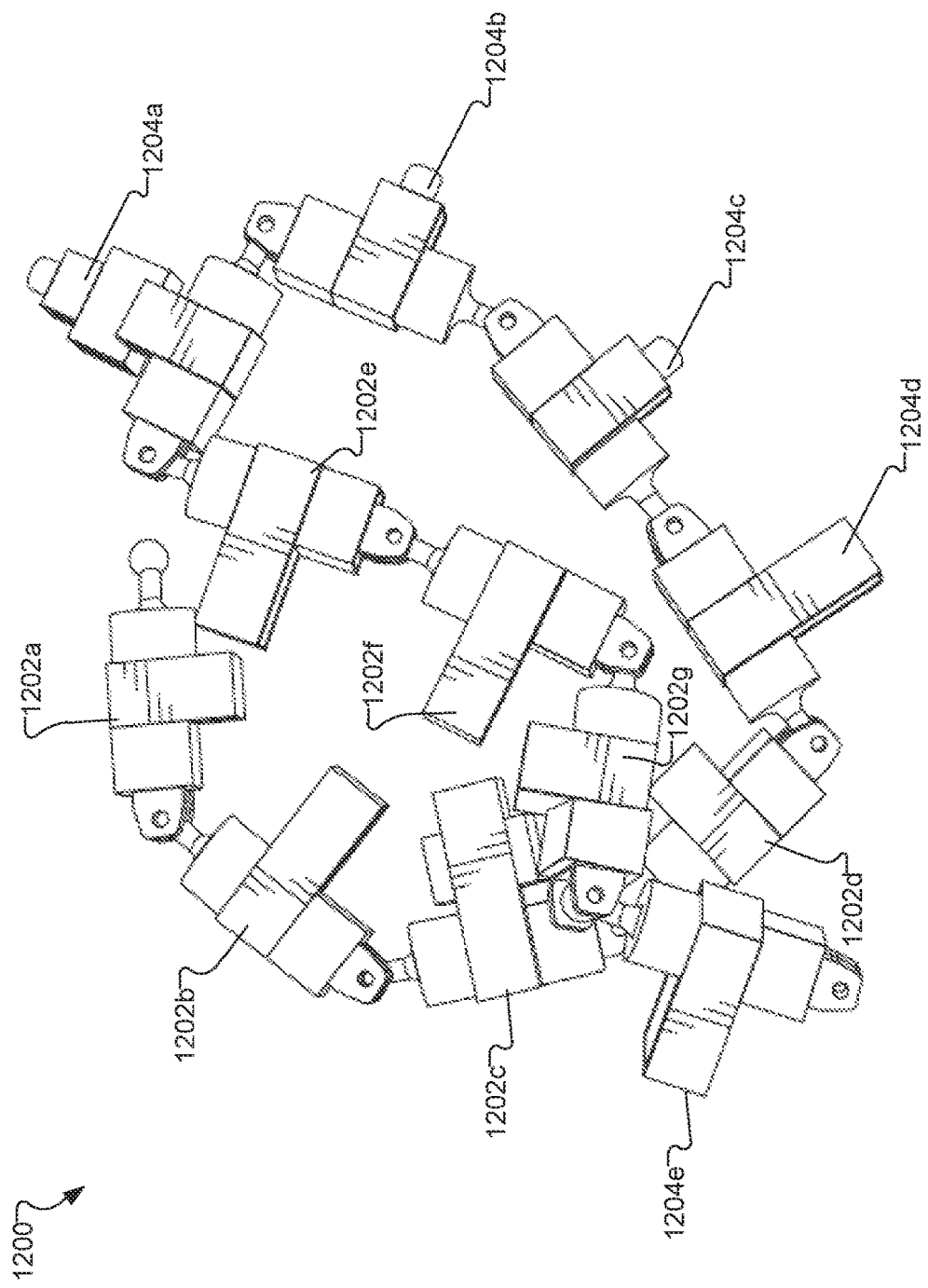
FIG. 12 is a perspective view of an exemplary embodiment of a model of amino acid assemblies in the tertiary level of protein folding.

FIG. 12 is a perspective view of an exemplary embodiment of a model of amino acid assemblies in the tertiary level of protein folding. More specifically, the example shown is a tertiary structure of a folded protein in a hydrophilic environment. In some embodiments, the side-chain building blocks can be colored or otherwise designated based on whether they represent an amino acid that is hydrophobic or hydrophilic. Note that the side-chain building blocks that are designated to be hydrophobic 1202a-1202g are turned inward and away from water in their environment. Conversely, the side-chain building blocks that are designated to be hydrophilic 1204a-1204e are turned outward toward water in their environment.

Figures 13A, 13B:
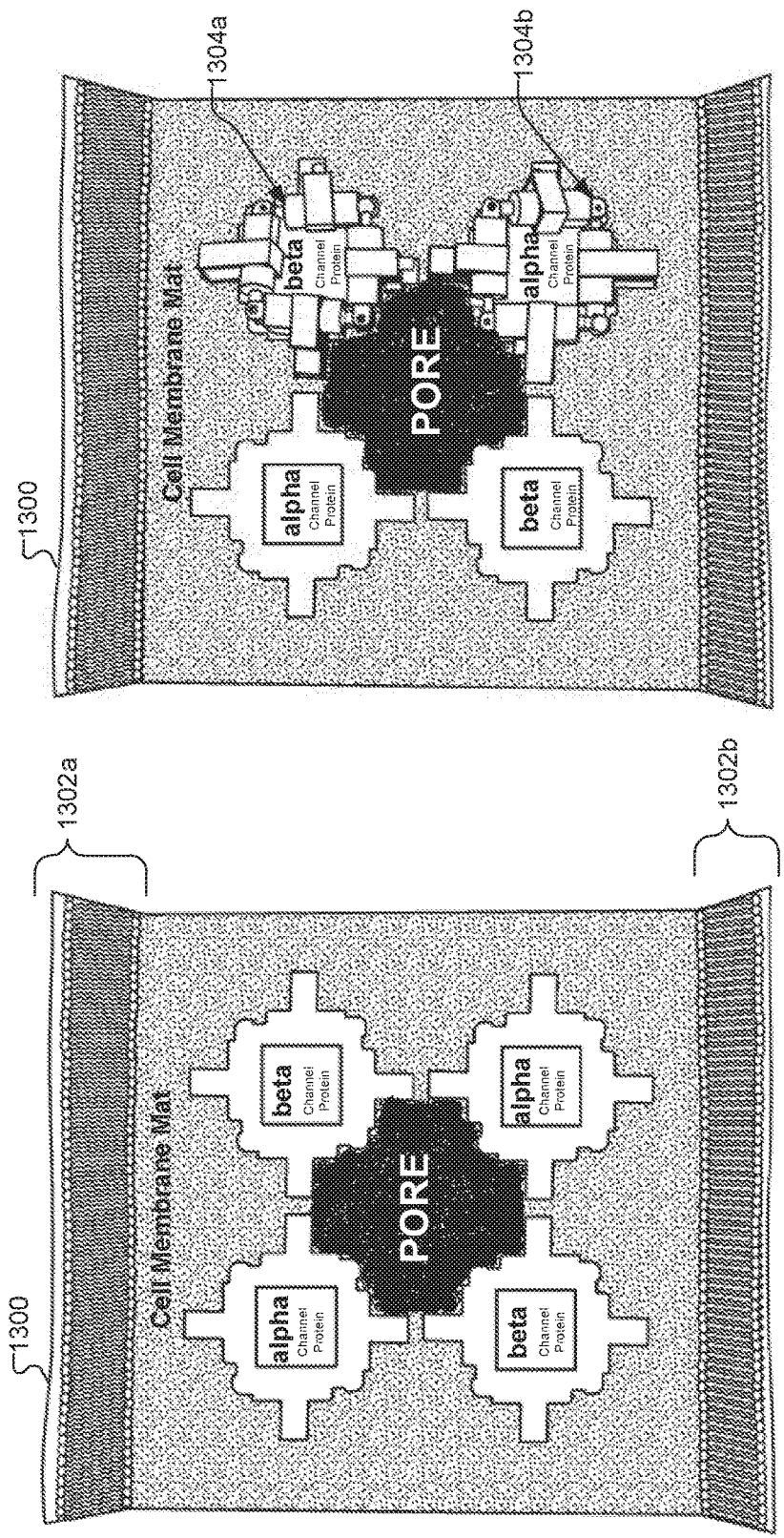
FIGS. 13A-13B are top views of an exemplary embodiment of a cell membrane mat representing a portion of a cell membrane around a pore.

FIGS. 13A-13B are top views of an exemplary embodiment of a cell membrane mat representing a portion of a cell membrane around a pore. FIG. 13A shows the cell membrane mat 1300 with two edges 1302a, 1302b that can be folded up to represent the thickness of the membrane. The cell membrane mat 1300 is configured to provide four positions for folded proteins. In this example, the cell membrane mat provides two positions for alpha-channel proteins and two positions for beta-channel proteins. FIG. 13B shows two different helix-shaped proteins 1304a and 1304b positioned over their respective positions. A full cell membrane mat would host helices of a first kind in positions labeled "alpha" and helices of a second kind in positions labeled "beta". Once a cell membrane mat is modeled with the four helix-shaped models, the modeling of the quaternary level of protein folding can be achieved using the kit of educational building blocks.

The embodiments of the invention described above are intended to be merely exemplary; numerous variations and modifications will be apparent to those skilled in the art. All such variations and modifications are intended to be within the scope of the present invention as defined in any of the appended claims.

What is claimed is:

1. A kit of educational building blocks that can be assembled to model protein assembly from amino acids, the kit comprising:
   a first set of amino acid side chain building blocks, each amino acid side chain building block corresponding to a distinct one of twenty (20) distinct amino acid side chains;
   a second set of identical amino end building blocks, each amino end building block having a first end configured to removably engage with any of the amino acid side chain building blocks to form an amino end-side chain block combination; and
   a third set of identical acid end building blocks, each acid end building block having a first end configured to removably engage with any amino end-side chain block combination to produce an amino acid building block assembly;
   wherein the first, second, and third set of blocks are configured so that a plurality of amino acid building block assemblies can be linked to one another so as to model a series of linked amino acids in a protein.

2. A kit according to claim 1, wherein the first end of the second set of identical amino end building blocks is shaped as a rod with a long axis of length 1, the rod having a cross-section corresponding to a polygon.

3. A kit according to claim 2, wherein the first end of the third set of identical acid end building blocks is shaped with a cavity to mate with the first end of the second set of identical amino end building blocks, the cavity having a cross-section corresponding to the polygon.

4. A kit according to claim 3, wherein the polygonal cross-section of the rod prevents rotational motion of one of the third set of identical acid end building block relative to one of the second set of identical amino end building blocks about the long axis of the rod, when the one of the third set of identical acid end is coupled to the one of the second set of identical amino end building blocks.

5. A kit according to claim 3, wherein the first set of amino acid side chain building blocks is shaped to have a cylindrical aperture, the circumference of the aperture greater than a circumference of a circle inscribing the polygon, such that, when the amino-side chain block combination is formed, the cylindrical aperture does not prevent rotational motion of one of the first set of amino acid side chain building blocks relative to one of the second set of identical amino end building blocks.

6. A kit according to claim 3, wherein the polygon is cross-shaped.

7. A kit according to claim 1, wherein the first set of amino acid side chain building blocks is shaped and colored in twenty differentiated combinations such that each of the first set of amino acid side chain building blocks is visually distinguishable from one another.

8. A kit according to claim 1, wherein a second end of each of the amino end building blocks is shaped to removably engage with a second end of each of the acid end building blocks.

9. A kit according to claim 8, wherein the second end of each of the amino end building blocks is shaped to allow rotational motion of the second end of each of the acid end building blocks in at least one axis.

10. A kit according to claim 9, wherein the second end of each of the amino end building blocks is shaped to allow rotational motion of the second end of each of the acid end building blocks in three axes.

11. A kit according to claim 9, wherein the second end of each of the amino end building blocks is shaped as a bracket and the second end of each of the acid end building blocks is shaped as a knob.

12. A kit according to claim 1, wherein a subset of the first set of amino acid side chain building blocks has a first end configured to removably engage with a fourth set of special feature building blocks.

13. A kit according to claim 12, further comprising the fourth set of special feature building blocks, each special feature building block having a first end configured to removably engage with the subset of the first set of amino acid side chain building blocks.

14. A kit according to claim 13, wherein the fourth set of special feature building blocks is shaped as a flexible tube having a second end configured to removably engage with the subset of the first set of amino acid side chain building blocks, the flexible tube corresponding to a disulfide bond.

15. A kit according to claim 14, wherein the flexible tube is configured to connect two distinct amino acid building block assemblies.

16. A kit according to claim 13, wherein the fourth set of special feature building blocks is shaped as a cylinder corresponding to a phosphorylated protein.

17. A kit according to claim 1, wherein the first end of the second set of identical amino end building blocks is shaped as a rod with a long axis of length 1 and wherein a subset of the first set of amino acid side chain building blocks has an anti-rotation shape that prevents rotational motion of the subset structures about the long axis of the rod.

18. A kit according to claim 1, wherein the kit is configured to model primary, secondary, tertiary, and quaternary levels of protein folding.

19. A kit according to claim 1, further comprising a cell membrane layout mat illustrating a cell membrane and positions for at least two models of proteins.

20. A kit according to claim 1, further comprising a fifth-set of tRNA building blocks corresponding to a tRNA, each of the fifth-set of tRNA building blocks having a first end shaped as a bracket shape to removably engage with the first end of the second set of amino end building blocks and a second end configured to removably engage with a model of an anti-codon.

21. A kit according to claim 20, further comprising a ribosome layout mat illustrating reading of mRNA code by tRNA and assembling protein as a sequence of amino acids.

* * * * *

UNITED STATES PATENT AND TRADEMARK OFFICE
CERTIFICATE OF CORRECTION

PATENT NO. : 10,410,540 B2
APPLICATION NO. : 15/459232
DATED : September 10, 2019
INVENTOR(S) : John Kim Vandiver et al.

It is certified that error appears in the above-identified patent and that said Letters Patent is hereby corrected as shown below:

In the Claims

In Column 12, Line 14:
Replace "fifth-set"
With "set"

In Column 12, Line 15:
Replace "fifth-set"
With "set"

Signed and Sealed this
Twenty-sixth Day of November, 2019

Andrei Iancu
*Director of the United States Patent and Trademark Office*